United States Patent
Kawashima

(10) Patent No.: US 10,491,761 B2
(45) Date of Patent: Nov. 26, 2019

(54) INFORMATION PROCESSING APPARATUS, CONTROL METHOD FOR INFORMATION PROCESSING APPARATUS, AND STORAGE MEDIUM, FOR DISPLAYING A CANDIDATE FOR SELECTION

(71) Applicant: CANON KABUSHIKI KAISHA, Tokyo (JP)

(72) Inventor: Yasuaki Kawashima, Tsukubamirai (JP)

(73) Assignee: Canon Kabushiki Kaisha, Tokyo (JP)

( * ) Notice: Subject to any disclaimer, the term of this patent is extended or adjusted under 35 U.S.C. 154(b) by 56 days.

(21) Appl. No.: 15/820,065

(22) Filed: Nov. 21, 2017

(65) Prior Publication Data

US 2018/0152569 A1 May 31, 2018

(30) Foreign Application Priority Data

Nov. 29, 2016 (JP) .................................. 2016-230826

(51) Int. Cl.
   G06F 15/00 (2006.01)
   G06F 3/12 (2006.01)
   G06K 1/00 (2006.01)
   H04N 1/00 (2006.01)

(52) U.S. Cl.
   CPC ....... *H04N 1/00212* (2013.01); *H04N 1/0097* (2013.01); *H04N 1/00411* (2013.01); *H04N 2201/0094* (2013.01)

(58) Field of Classification Search
   CPC .......... H04N 1/00212; H04N 1/00411; H04N 1/0097; H04N 2201/0094
   USPC ................................ 358/1.1, 1.15, 1.13, 1.14
   See application file for complete search history.

(56) References Cited

U.S. PATENT DOCUMENTS

2008/0010354 A1* 1/2008 Sasaki ................ H04N 1/00212
   709/206
2017/0078530 A1* 3/2017 Adachi ................ H04N 1/4433

FOREIGN PATENT DOCUMENTS

JP  2008-204483 A  9/2008

* cited by examiner

*Primary Examiner* — Douglas Q Tran
(74) *Attorney, Agent, or Firm* — Canon U.S.A., Inc. IP Division

(57) ABSTRACT

An information processing apparatus disclosed herein includes a transmitting unit configured to transmit image data, an obtaining unit configured to obtain identification information of a user, and a display unit configured to display a candidate for a domain name to be used in a destination address of the image data to be transmitted by the transmitting unit. In this case, the display unit displays a domain name based on the identification information obtained by the obtaining unit as a candidate for the domain name to be used in the destination address.

12 Claims, 14 Drawing Sheets

FIG. 18A

| SHARED | REGISTRATION NUMBER | DOMAIN NAME |
|---|---|---|
| | 1 | email-domain.jp |
| | 2 | co.jp |
| | 3 | com |
| | 4 | ne.jp |
| | 5 | net |

FIG. 18B

| USER ID | REGISTRATION NUMBER | DOMAIN NAME |
|---|---|---|
| | 1 | aaa.ne.jp |
| | 2 | yyy.co.jp |
| 11111 | 3 | com |
| | 4 | |
| | 5 | |

FIG. 18C

| USER ID | REGISTRATION NUMBER | REGISTERED NAME | MAIL ADDRESS |
|---|---|---|---|
| | 1 | A | aaa@email-domain.jp |
| | 2 | B | bbb@xxx.ne.jp |
| | 3 | C | ccc@yyy.ne.jp |
| abcde | 4 | D | ddd@xxx.ne.jp |
| | 5 | E | eee@email-domain.jp |
| | 6 | F | fff@xxx.ne.jp |

FIG. 18D

| USER ID | MAIL ADDRESS |
|---|---|
| email@email-domain.jp | email@email-domain.jp |
| 11111 | AAA@aaa.ne.jp |
| abcde | BBB@bbb.com |

INFORMATION PROCESSING APPARATUS, CONTROL METHOD FOR INFORMATION PROCESSING APPARATUS, AND STORAGE MEDIUM, FOR DISPLAYING A CANDIDATE FOR SELECTION

BACKGROUND

Field

The present disclosure relates to an information processing apparatus for displaying a candidate for a character string to be input, a control method therefor and a storage medium therefor.

Description of the Related Art

An information processing apparatus has been known which, while a user is attempting to input an e-mail address, can display candidate domain names which are registered in advance, for the domain name to be input. In such an information processing apparatus, a user may select one of the candidate domain names to input the intended domain name. Japanese Patent Laid-Open No. 2008-204483 discloses extracting a character string located after an at sign in an e-mail address input by a user and storing the character string as a candidate for a domain name. The stored domain name may then be displayed as a domain name candidate the next time that a user attempts to input an e-mail address.

In such an information processing apparatus, however, domain name candidates to be displayed on a screen are not determined for each user. To any user who is inputting a domain name to the information processing apparatus, pre-stored domain name candidates are displayed. The displayed domain name candidates are not specifically determined for the user. As a result, a domain name which is rarely input by a user may sometimes be displayed as a candidate for the domain name that the user is inputting, which may lower the usability of this feature.

SUMMARY

Various embodiments of the information processing apparatus disclosed herein determine a domain name candidate to be displayed specifically for each user who is using the information processing apparatus.

In various embodiments, an information processing apparatus disclosed herein includes a transmitting unit configured to transmit image data, an obtaining unit configured to obtain identification information of a user, and a display unit configured to display a candidate for a domain name to be used in a destination address of the image data to be transmitted by the transmitting unit. In some embodiments, the display unit displays a domain name based on the identification information obtained by the obtaining unit, as a candidate for the domain name to be used in the destination address.

Further features will become apparent from the following description of exemplary embodiments with reference to the attached drawings.

BRIEF DESCRIPTION OF THE DRAWINGS

FIGS. 18A to 18D are schematic diagrams illustrating domain name databases and address books to be stored in a hard disk according to an embodiment.

DESCRIPTION OF THE EMBODIMENTS

First Embodiment

Best modes for embodying various embodiments of the present disclosure will be described below. It should be understood that the following embodiments are not intended to limit the present disclosure and that all of the combinations of features according to the described embodiments are not necessary in all embodiments of the present disclosure.

Figure 1:
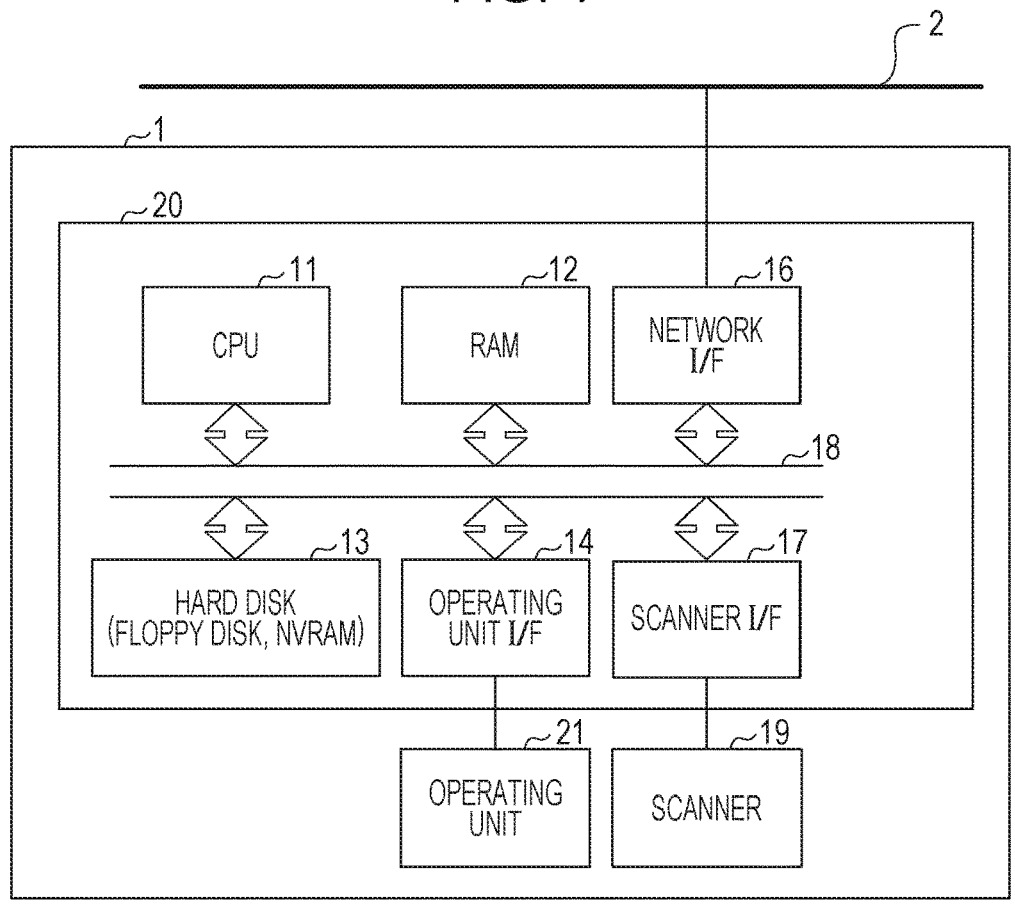
FIG. 1 illustrates an example of a hardware configuration of an information processing apparatus according to an embodiment.

FIG. 1 illustrates an example of a configuration diagram of a hardware block in an information processing apparatus according to an embodiment of the present disclosure. An information processing apparatus 1 implements various embodiments of the present disclosure. An information processing apparatus according to a first embodiment is an apparatus such as a multifunction peripheral which can exchange image data, for example, by using an e-mail address.

A control unit 20 includes a CPU 11, a RAM 12, a network interface (I/F) 16, a hard disk 13, an operating unit interface (I/F) 14, and a scanner 19. These components can exchange information via a main bus 18. The information processing apparatus 1 is connected to a network 2 connecting to another communicate apparatus such as a mail server through a network interface (I/F) 16. According to the first embodiment, the CPU 11 is configured to control the RAM 12, the hard disk 13, the operating unit I/F 14, the network I/F 16, and a scanner interface (I/F) 17 via the main bus 18 unless otherwise specified.

The CPU 11 may read out a control program stored in a storage device such as the hard disk 13 to control the information processing apparatus 1. The RAM 12 may provide a work area and a temporary storage area for the CPU 11. The hard disk 13 may be a storage device configured to store a program to be executed by the CPU 11 and to store various settings and files. The hard disk 13 may be a storage device of other kinds such as a floppy disk and an NVRAM (Non-Volatile RAM). The hard disk 13 may further store an address book which manages destinations to be used by the information processing apparatus 1 for transmitting a document to another information processing apparatus over the network 2. Such an address book may be managed as a personal address book for each user. A log-in user is allowed to view his or her personal address book only and is not allowed to read out and use a destination registered in an address book for a different user, from the address book for the different user. The hard disk 13 is configured to manage an e-mail address for each user.

The operating unit I/F 14 is configured to connect an operating unit 21 and the control unit 20. The operating unit 21 may be a liquid crystal display unit having a touch panel function. The operating unit 21 may operate as a display device and an input device configured to receive inputs from a user. The operating unit I/F 14 is configured to obtain an input to the operating unit 21 and passes the obtained operation content to the CPU 11. The CPU 11 is configured to generate a display screen to be displayed on the operating unit 21 based on information received from the operating unit I/F 14.

The scanner I/F 17 is configured to connect the scanner 19 and the control unit 20. The scanner 19 may be a document scanning apparatus configured to scan a document and generate image data therefrom. The scanner 19 is configured to input the generated image data to the control unit 20 through the scanner I/F 17. The information processing apparatus 1 may use the scanner 19, attach an e-mail to the image data generated by scanning a document, and may transmit the image data and email to another information processing apparatus.

Figure 2:
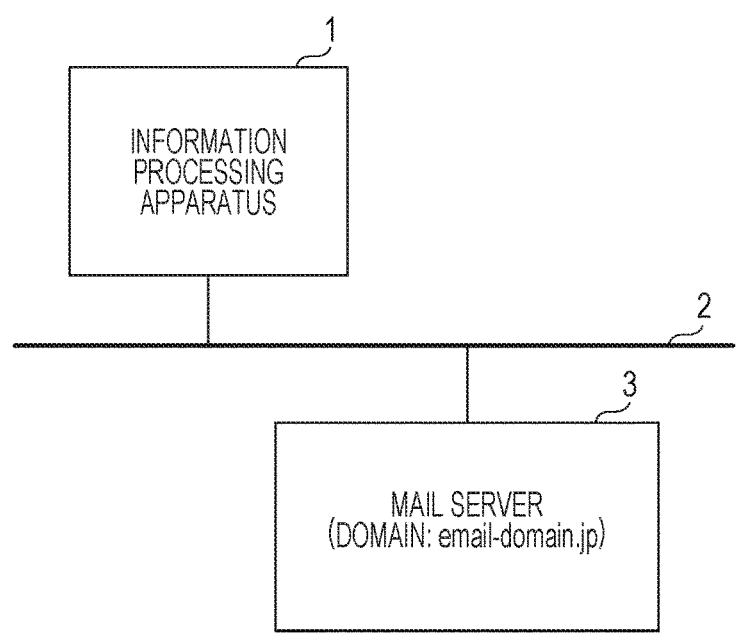
FIG. 2 illustrates an example of a system configuration including the information processing apparatus according to one embodiment.

FIG. 2 illustrates an example of a system configuration including the information processing apparatus 1 according to this embodiment. The information processing apparatus 1 and a mail server 3 are connected over the network 2. A domain name "email-domain.jp" is set for the mail server 3. According to this embodiment, a character string located after a delimiter, such as an at sign, in a character string included in an e-mail address is called a domain name.

First, a flow of operations for inputting an e-mail address according to this embodiment will be described with reference to FIGS. 3 to 6.

Figure 3:
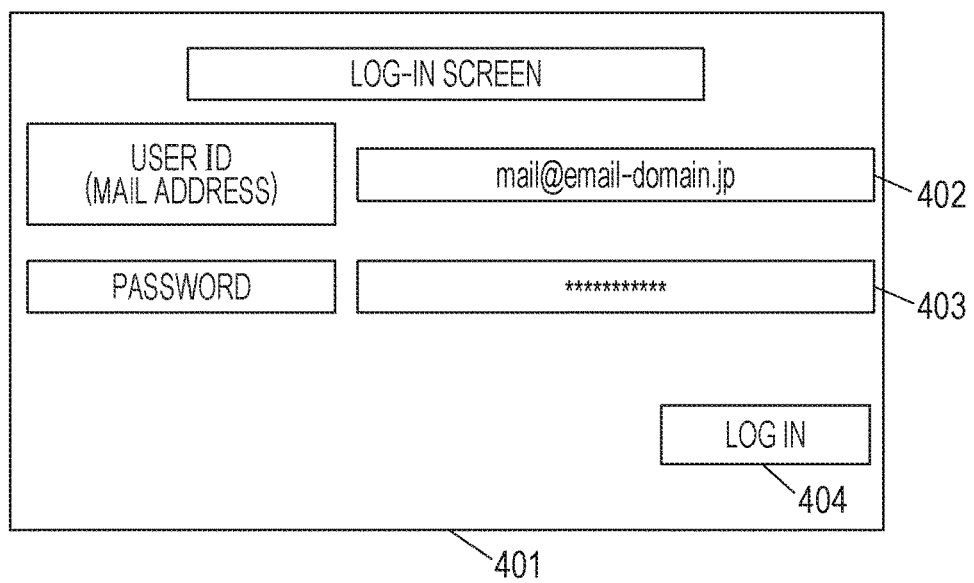
FIG. 3 illustrates an example of a log-in screen to be displayed on an operating unit according to an embodiment.

FIG. 3 illustrates an example of a log-in screen 401 to be displayed on the operating unit 21 when a user logs into the information processing apparatus 1. The log-in screen 401 displays a user ID input field 402, a password input field 403, and a "LOG IN" button 404.

The user ID input field 402 may display a user ID input by a user. In response to a pressing of the user ID input field 402 performed by a user, the operating unit 21 displays a software keyboard, not illustrated. The operating unit 21 then displays a character string input by the user in the user ID input field 402. While this embodiment assumes that a user ID is an e-mail address of a user, the user ID is not limited to an e-mail address of a user.

When a user presses the password input field 403, a software keyboard may also be displayed on the operating unit 21, like the user ID input field 402, and the user may press keys to input a password on the software keyboard so that the input password is displayed in the password input field 403.

In response to a press on the "LOG-IN" button 404 performed by a user, the information processing apparatus 1 performs log-in processing. While this embodiment uses a user ID and a password to perform log-in processing, log-in processing may be performed by another method using an IC card, for example.

Figure 4:
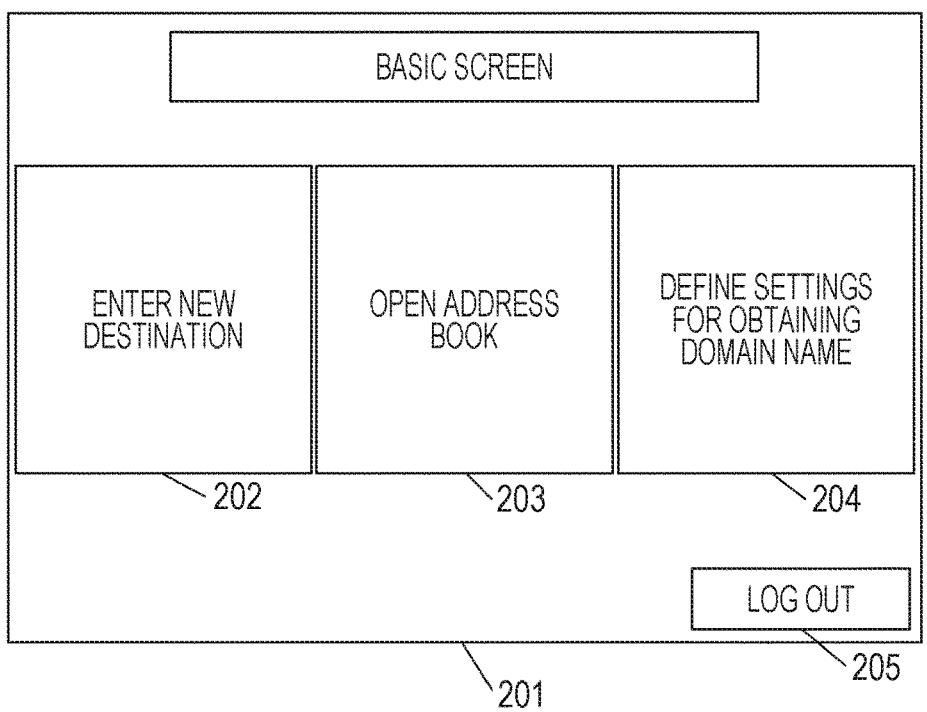
FIG. 4 illustrates an example of a basic screen to be displayed on an operating unit according to an embodiment.

FIG. 4 illustrates an example of a basic screen 201 for defining settings regarding a destination to be displayed on the operating unit 21 after a user logs into the information processing apparatus 1. This screen is displayed on the operating unit 21 in response to a predetermined operation performed by a user after he or she logs in. The predetermined operation may be an operation for displaying a screen relating to destination settings to be performed on a screen for using a facsimile function or an e-mail function, for example, by a user.

A button 202 is usable by a user for displaying a screen for newly inputting a destination. A button 203 is usable for opening an address book. A button 204 is usable by a user for defining a setting relating to a domain name button to be displayed on the e-mail address input screen. A "LOG OUT" button 205 is usable by a user for performing processing for logging out from the information processing apparatus 1.

Figure 5:
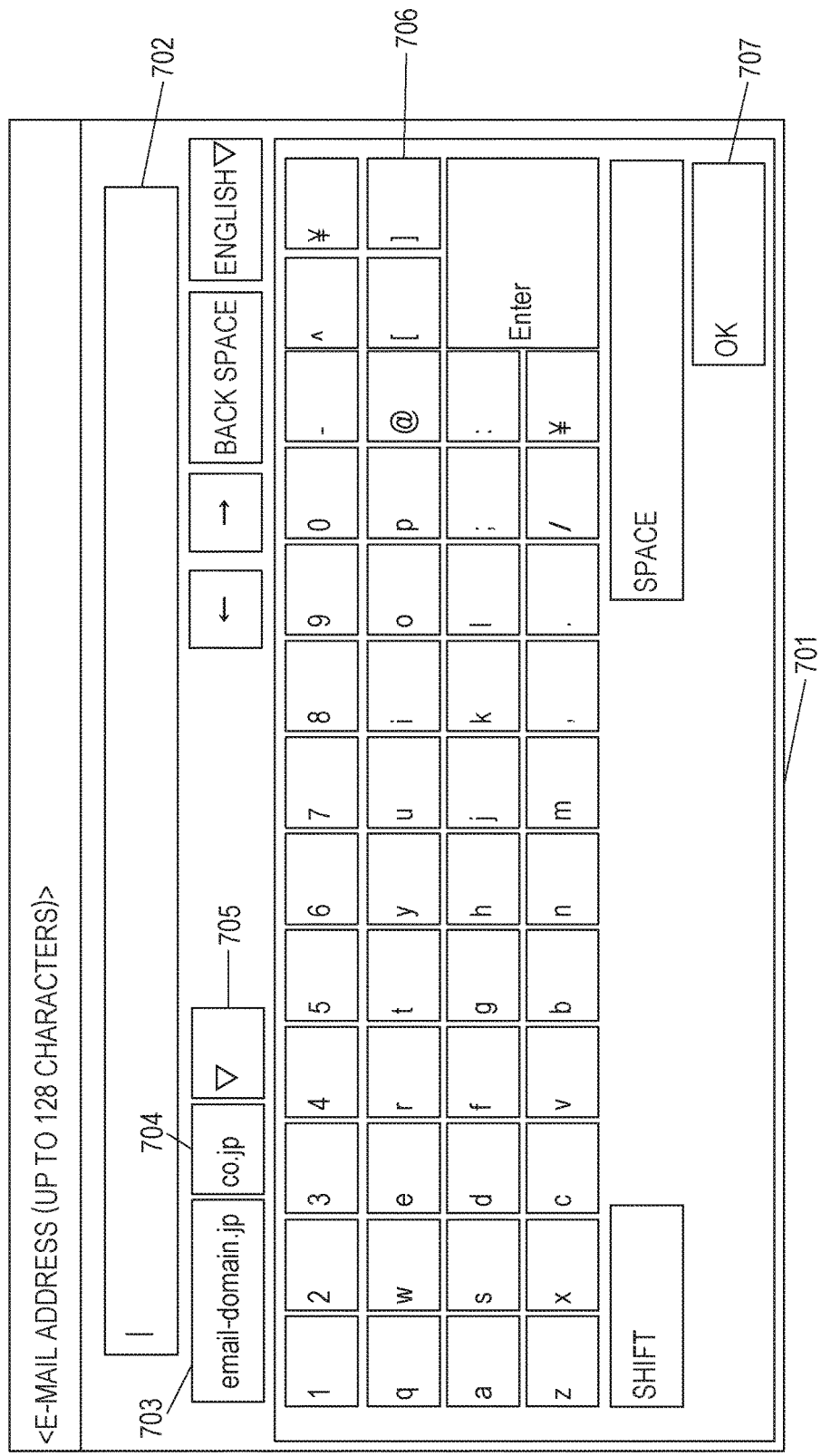
FIG. 5 illustrates an example of an e-mail address input screen to be displayed on an operating unit according to an embodiment.

FIG. 5 illustrates an example of a screen to be displayed on the operating unit 21 as a screen for inputting an e-mail address. An e-mail address input screen 701 is to be displayed on the operating unit 21 when a user presses the button 202 on the basic screen 201 or when an operation for adding a new destination to an address book is performed after the button 203 is pressed. A user may press text input keys 706 so that text corresponding to pressed keys is displayed in an address display area 702. Domain name buttons 703 and 704 are usable for inputting a domain name. Referring to FIG. 5, two domain name buttons are displayed. However, the number of domain name buttons to be displayed is not limited thereto. In response to a press on one of the domain name buttons 703 and 704 performed by a user, a domain name displayed on the domain name button is displayed at the end of the character string displayed in the address display area 702.

Figure 6:
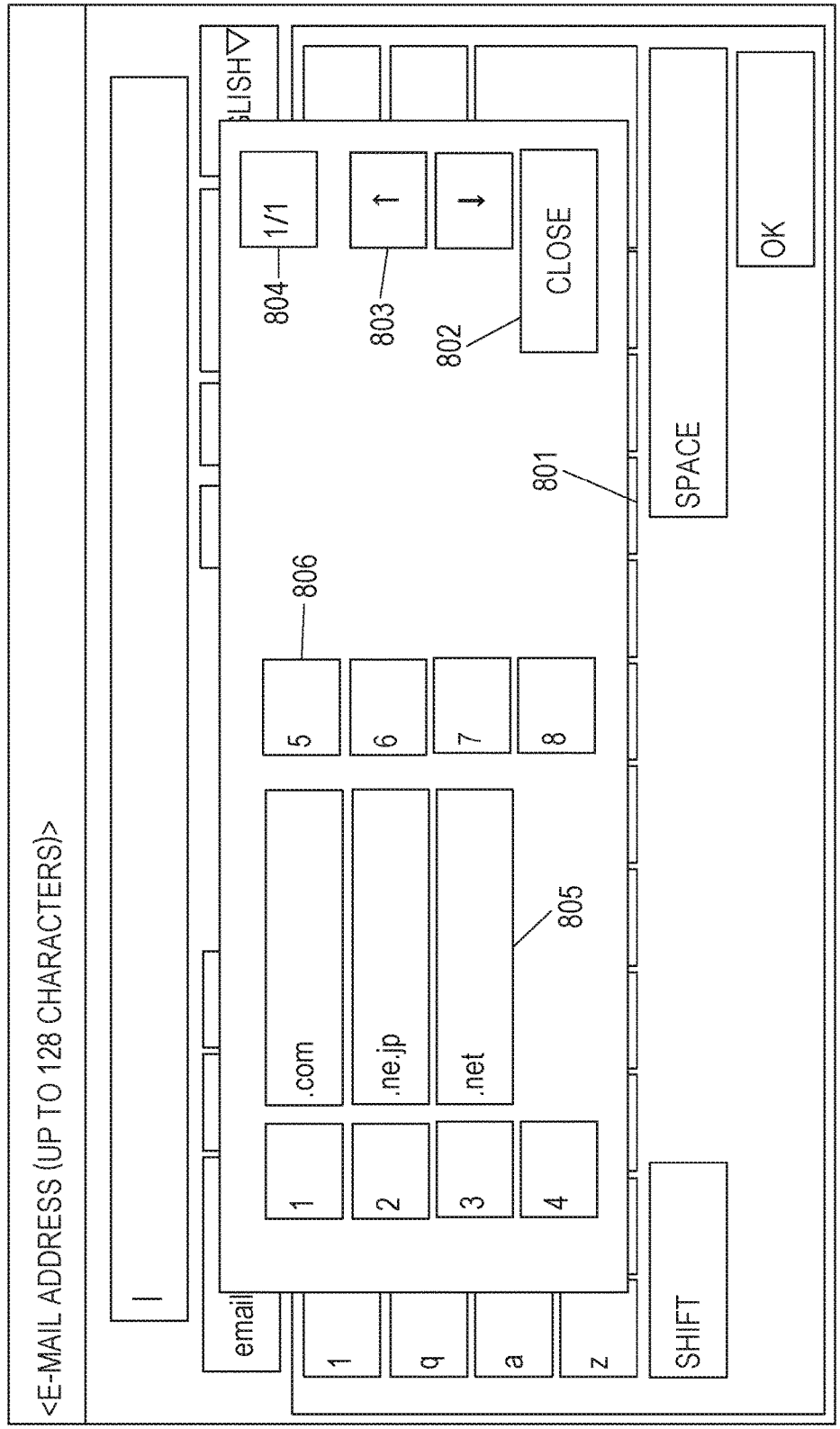
FIG. 6 illustrates an example of a pop-up screen over the e-mail address input screen displayed on an operating unit according to an embodiment.

A button 705 is usable for displaying a domain name that is not displayed on the domain name buttons 703 and 704. In response to a press of the button 705 performed by a user, a pop-up screen 801 illustrated in FIG. 6 is displayed.

An area 804 displays a total number of pages of a screen 801 and the page number of the currently displayed pages. Referring to FIG. 6, the screen 801 displays the first page of one page in total, the area 804 displays "1/1". A button 803 is usable for moving to another page. Referring to FIG. 6, because there is no page other than the currently displayed page, the button 803 is displayed in a gray-out state. If moving to another page is possible, the button 803 is not displayed in a gray-out state. The page to be displayed is changed in response to a press of the button 803 performed by a user.

In response to a press on a domain name button 805 performed by a user, the applicable domain name is displayed on the address display area 702. When a user presses a number button 806, the domain name on the domain name button 805 displayed on the right-hand side of the number button is displayed on the address display area 702. A user may also use one of the domain name button 805 and the number button 806 to input a domain name. The information processing apparatus 1 may have a numeric keypad, not illustrated, and the numeric keypad may be used to input a number so that the domain name displayed on the right-hand side of the number button 806 corresponding to the input number may be input. A "CLOSE" button 802 is usable for closing the screen 801. After a user presses the domain name button 805 or the number button 806 and inputs a domain name, the user may press the "CLOSE" button 802 to close the screen and return to the e-mail address input screen 701.

Each of the domain name buttons 703, 704, and 805 can display a domain name stored in a shared domain name database prestored in the hard disk 13, for example.

Alternatively, each of the domain name buttons 703, 704, and 805 may display a domain name of an e-mail address registered with a personal address book which is allowed to be used by a log-in user or a domain name of an e-mail address of the user. A domain name to be used may be registered with a personal domain name database for each user, and the domain name registered with the domain name database of a log-in user may be displayed on one of the domain name buttons.

By using an e-mail address registered with a personal address book of a log-in user, an e-mail address of the user, or a personal domain name database for each user, a domain name to be displayed on a domain name button may be determined for each log-in user. According to this embodiment, it may be set in advance such that a domain name obtained by a user based on a certain method can be displayed on a domain name button on the e-mail address input screen 701. In accordance with the setting, the domain name to be displayed on the domain name button is obtained, and a domain name button having the domain name thereon is displayed on the e-mail address input screen 701.

With reference to FIGS. 18A to 18D, information stored in the hard disk 13 for obtaining a domain name to be displayed on a domain name button will be described. The information to be used for obtaining a domain name may be a database of user shared and user personal domain names, a user personal address book, a user ID, or a user e-mail address.

FIG. 18A is a schematic diagram of a shared domain name database which is stored in the hard disk 13 and which is usable when a user logs in. A registration number and a domain name are stored in the hard disk 13 in association. The e-mail address input screen 701 displays domain names in increasing order of the associated registration numbers. A domain name not displayed because of the limited space of the area for displaying domain name buttons on the e-mail address input screen 701 is displayed on the pop-up screen 801.

FIG. 18B is a schematic diagram illustrating a personal domain name database, which is stored in the hard disk 13, of a log-in user. A user ID field stores a user ID of a user associated with the personal domain name database. FIG. 18B illustrates a personal domain name database of a user with a user ID "11111".

FIG. 18C is a schematic diagram illustrating a personal address book which is stored in the hard disk 13 and which is managed for each user. The personal address book stores a user ID of a user who uses the address book and a registration number, a registered name, and an e-mail address of an address in association. FIG. 18C illustrates a personal address book of a user having a user ID "abcde".

FIG. 18D is a schematic diagram illustrating data which is stored in the hard disk 13 and which stores a user ID and an e-mail address of a log-in user. When a user logs in, the data are to be used for obtaining an e-mail address of a log-in user. For example, referring to FIG. 18D, when a user with a user ID "11111" logs in, an e-mail address "AAA@aaa.ne.jp" of the log-in user is obtained.

According to this embodiment, a domain name is obtained from one of shared and personal domain name databases, a personal address book, and e-mail addresses stored in forms illustrated in FIGS. 18A to 18D and is displayed on a domain name button.

Figure 7:
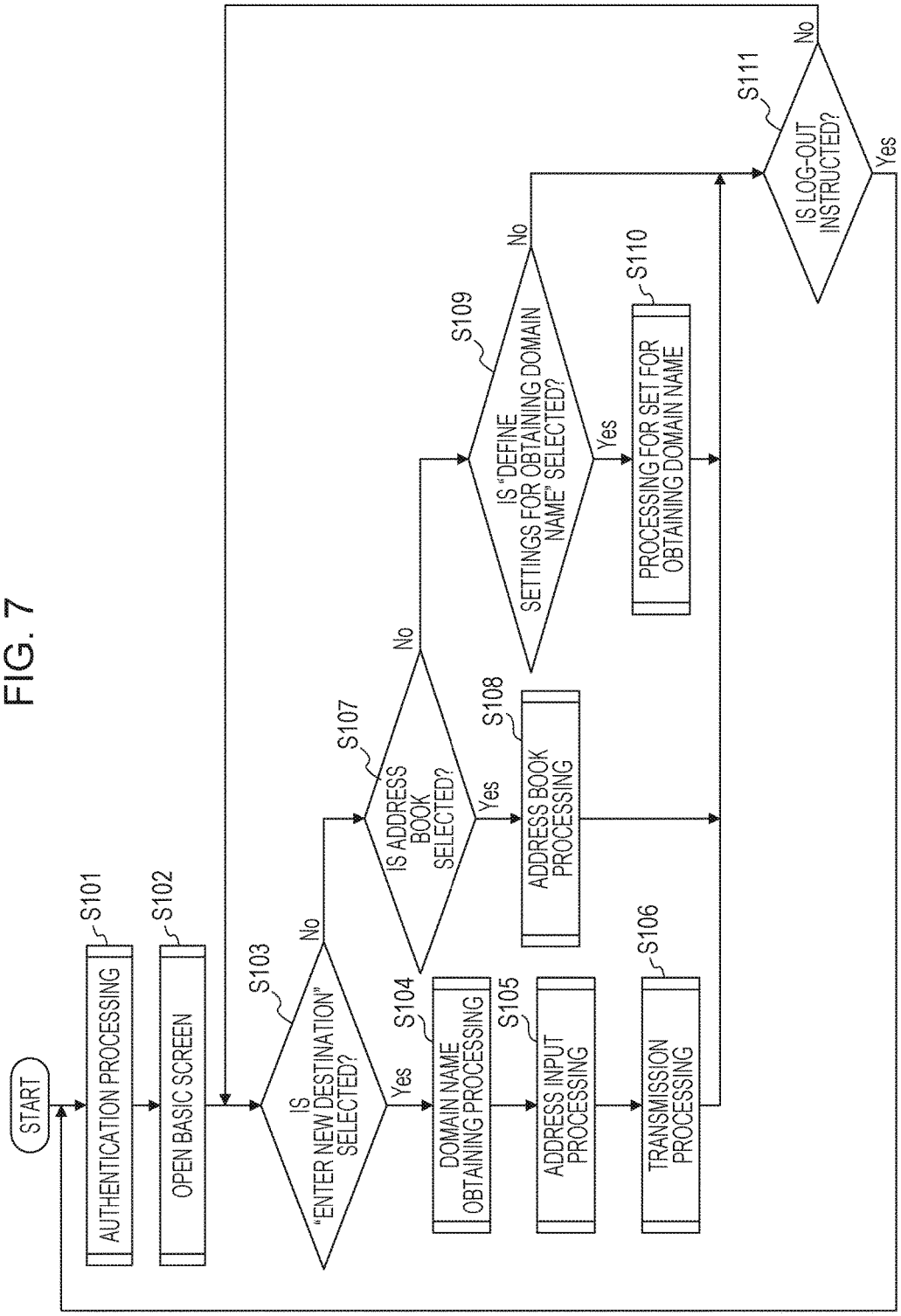
FIG. 7 is a flowchart illustrating a flow of processing from a log-in to a log-out according to an embodiment.

FIG. 7 is a flowchart illustrating a flow of processing to be performed during a period from a time when a user logs into the information processing apparatus 1 to a time when the user logs out. A program for executing the processing illustrated in FIG. 7 may be stored in the hard disk 13, be developed in the RAM 12, and be executed by the CPU 11.

The processing illustrated in the flowchart in FIG. 7 is started with supply of power to the information processing apparatus 1.

The CPU 11 executes authentication processing on a user (S101). Processing to be executed as the authentication processing will be described below with reference to FIG. 8.

The CPU 11 displays the basic screen 201 illustrated in FIG. 4 on the operating unit 21 in response to a predetermined operation performed by a user after a user logs in (S102).

The CPU 11 determines whether the user has pressed the button 202 for inputting a new destination on the basic screen 201 displayed on the operating unit 21 (S103). If it is determined that the button 202 has been pressed, the CPU 11 performs domain-name obtaining processing based on setting information stored in the hard disk 13 (S104). Processing details of the domain-name obtaining processing to be performed by the CPU 11 will be described below with reference to FIG. 9.

After the CPU 11 performs the domain-name obtaining processing, the CPU 11 performs address input processing (S105). Processing details to be performed by the CPU 11 in S105 will be described below with reference to FIG. 10.

After the CPU 11 performs the address input processing, an e-mail is transmitted to an input e-mail address (S106). The transmission processing to be performed by the CPU 11 in S106 will be described below with reference to FIG. 11. After the transmission processing is performed, the CPU 11 executes processing in S111.

Next, in S103, if it is determined that the button 202 has not been pressed, the CPU 11 determines whether the button 203 for defining a setting regarding an address book has been pressed (S107). If it is determined that the button 203 has been pressed, the CPU 11 performs address book processing for selecting a destination from an address book stored in the hard disk 13 or adding an address to the address book stored in the hard disk 13 (S108). The address book processing will be described below with reference to FIGS. 13 and 14. After the address book processing is executed, the CPU 11 executes the processing in S111.

In S107, if it is determined that the button 203 has not been pressed, the CPU 11 determines whether the button 204 has been pressed (S109). If it is determined in S109 that the button 204 has been pressed, the CPU 11 performs domain-name-obtaining setting processing (S110). The domain-name-obtaining setting processing is performed for setting a domain name to be displayed on the domain name button 703 or 704 to be displayed on the e-mail address input screen 701. The domain-name-obtaining setting processing will be described with reference to FIGS. 15 to 17. After the domain-name-obtaining setting processing is executed, the CPU 11 executes the processing in S112.

If it is determined in S109 that the button 204 has not been pressed, the CPU 11 determines whether the "LOG OUT" button 205 has been pressed (S111). If it is determined that the "LOG OUT" button 205 has been pressed, the CPU 11 executes processing for causing the log-in user to log out the information processing apparatus 1. After the CPU 11 completes the logout processing, the CPU 11 returns the processing to S101.

If it is determined that the "LOG OUT" button 205 has not been pressed, the CPU 11 returns the processing to S103.

Figure 8:
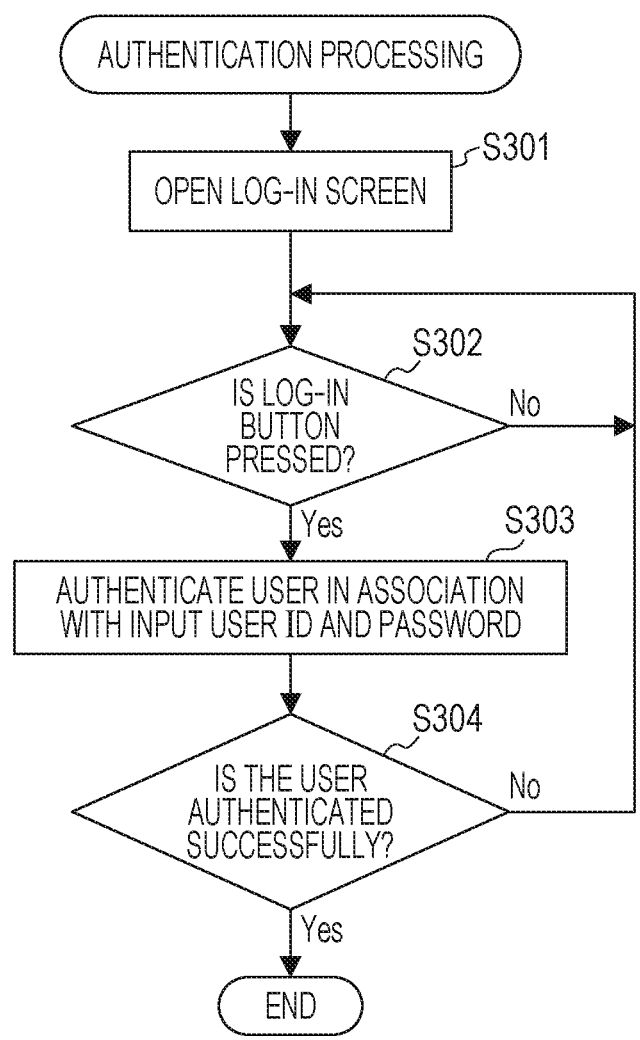
FIG. 8 is a flowchart illustrating a flow of authentication processing according to an embodiment.

FIG. 8 is a flowchart illustrating a flow of processing to be executed by the CPU 11 in the authentication processing in S101 in FIG. 7. The processing in the flowchart is implemented by a program stored in the hard disk 13, developed in the RAM 12 and executed by the CPU 11.

The CPU 11 displays the log-in screen 401 illustrated in FIG. 3 on the operating unit 21 (S301). After the log-in screen 401 is displayed, the CPU 11 receives a user ID and a password input from a user.

The CPU 11 determines whether the "LOG-IN" button 404 has been pressed (S302). If it is determined that the "LOG-IN" button 404 has been pressed, the CPU 11 authenticates the user by using the input user ID and password (S303). If it is determined that the "LOG-IN" button 404 has not been pressed, the processing in S302 is continuously performed. According to this embodiment, the hard disk 13 stores a user ID and a password in association, and the CPU 11 checks whether user information having the input user ID and password is stored in the hard disk 13. The information containing a user ID and a password in association may be stored in a storage device such as an external server connected over the network 2. In this case, in S303, the CPU 11 checks whether user information having the user ID and password input onto the log-in screen 401 is stored in the external server.

The CPU 11 determines the authentication has succeeded (S304). If user information having the user ID password input onto the log-in screen 401 is in the hard disk 13, the CPU 11 determines that the authentication has succeeded. Then, the processing on the flowchart ends. If the authentication has not succeeded, the CPU 11 returns the processing to S302. In this case, a screen for notifying a user of that the authentication has failed is displayed on the operating unit 21.

Having described the processing illustrated in FIG. 8 as the authentication processing according to this embodiment, any other publicly known method may be applied if a user of the information processing apparatus can be identified.

Figure 9:
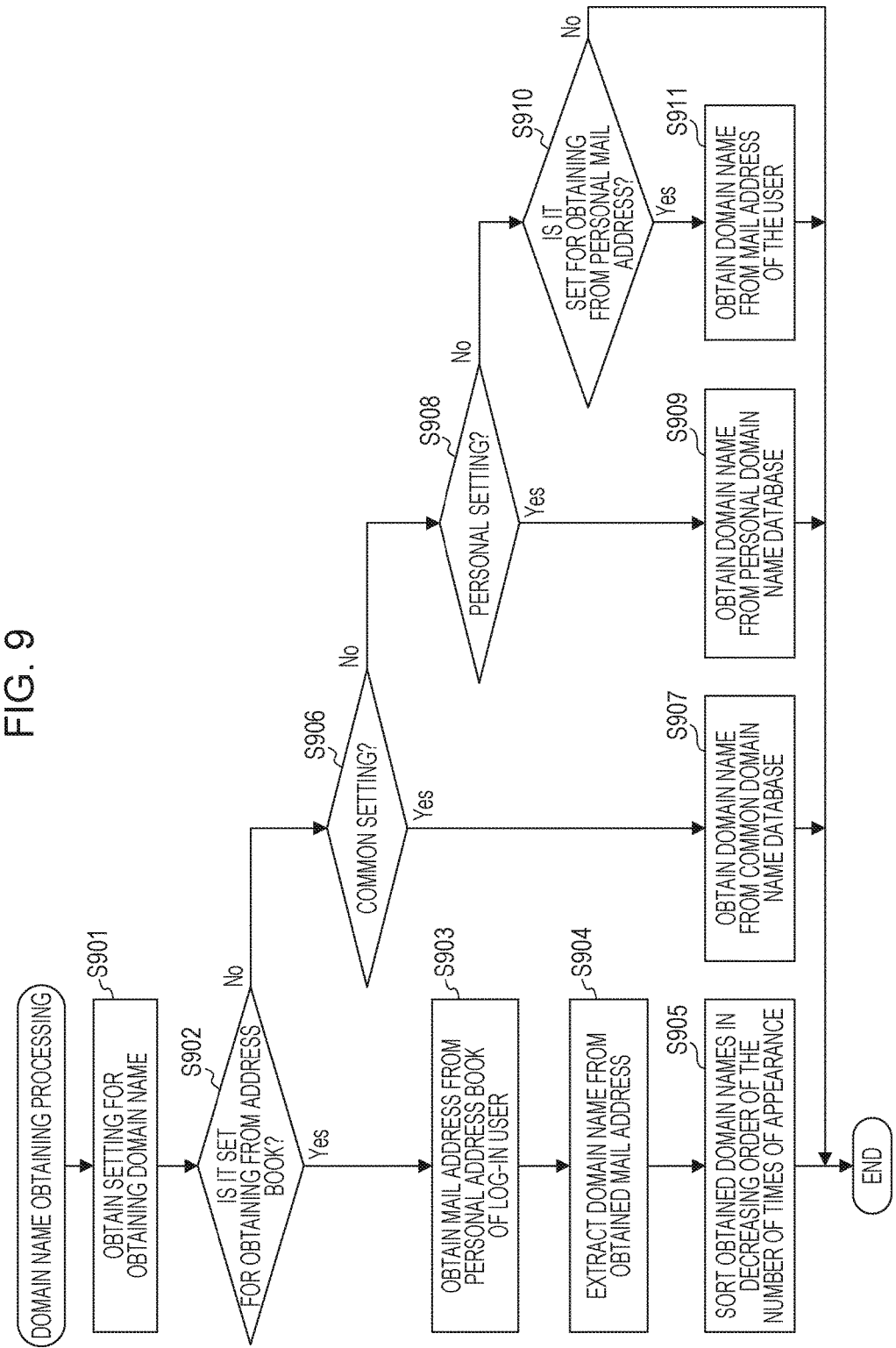
FIG. 9 is a flowchart illustrating domain-name obtaining processing according to an embodiment.

FIG. 9 is a flowchart illustrating a flow of processing to be executed by the CPU 11 in the domain-name obtaining processing in S104 in FIG. 7. The processing according to the flowchart is implemented by a program which is stored in the hard disk 13, is developed in the RAM 12, and is executed by the CPU 11. The processing illustrated in FIG. 9 is started in response to a press of the button 202 performed by a user on the basic screen 201 displayed in the operating unit 21.

The CPU 11 obtains a setting for obtaining a domain name stored in the hard disk 13 (S901). A setting for obtaining a domain name can be defined by executing the processing in S109 in FIG. 7.

The CPU 11 determines whether the setting obtained in S901 is defined to obtain a domain name from an address book (S902). If the setting obtained in S901 is defined to obtain a domain name from an address book, the CPU 11 obtains an e-mail address stored in a personal address book, which is stored in the hard disk 13, of a log-in user (S903). For example, if the log-in user has a user ID "abcde", all e-mail addresses with registration numbers 1 to 6 are obtained from the personal address book as illustrated in FIG. 18C, which is stored in the hard disk 13.

The CPU 11 obtains a domain name from the e-mail addresses obtained in S903 (S904). The CPU 11 extracts, as a domain name, a character string located after a predetermined delimiter such as an at sign from the obtained e-mail address. For example, in a case where an e-mail address "aaa@email-domain.jp" is obtained in S901, a part "email-domain.jp" is extracted as a domain name. This is performed on all of the e-mail addresses registered with the personal address book.

The CPU 11 sorts the extracted domain names in decreasing order of the number of e-mail addresses registered with the address book (S905). For example, the personal address book illustrated in FIG. 18C has three e-mail addresses including "xxx.ne.jp", two e-mail addresses including "email-domain.jp", and one e-mail address including "yyy.co.jp". In this case, in S905, the CPU 11 sorts the obtained domain names in order of "xxx.ne.jp", "email-domain.jp", and "yyy.co.jp". After the processing in S905 completes, the CPU 11 exits the processing in the flowchart.

In S902, if the setting obtained in S901 is not defined to obtain a domain name from the address book, the CPU 11 determines whether the obtained setting is a common setting (S906). A common setting is a setting for displaying on a domain name button on the e-mail address input screen, a domain name registered with a shared domain name database stored in the hard disk 13 even when any user logs into the information processing apparatus 1.

If the setting obtained in S901 is a common setting, the CPU 11 obtains a domain name stored in a shared domain name database stored in the hard disk 13 (S907). For example, if the shared domain name database is the one illustrated in FIG. 18A, the CPU 11 obtains all of five domain names having registration numbers 1 to 5 in S907. After the processing in S907, the processing illustrated in FIG. 9 ends.

If the setting obtained in S901 is not a common setting, the CPU 11 determines whether the obtained setting is a personal setting (S908). A personal setting is a setting for displaying a domain name button by using a personal domain name database stored in association with user information in the hard disk 13.

If the setting obtained in S901 is a personal setting, the CPU 11 obtains a domain name registered with a personal domain name database of a log-in user (S909). For example, when a log-in user has a user ID "11111" and his or her personal domain name database is the one in FIG. 18B, the CPU 11 in S909 obtains all of three domain names having registration numbers 1 to 3. After the processing in S909 ends, the processing illustrated in FIG. 9 ends.

If the setting obtained in S901 is not a personal setting, the CPU 11 determines whether the obtained setting is a setting defined to obtain a domain name from a personal e-mail address (S910). If the setting obtained in S901 is a setting defined to obtain a domain name from a personal e-mail address, the CPU 11 obtains an e-mail address of the log-in user from the hard disk 13. After that, a character string located after a delimiter such as an at sign is extracted from the obtained e-mail address (S911). For example, when the log-in user has a user ID "11111", an e-mail address "AAA@aaa.ne.jp" of the log-in user is obtained from the one in FIG. 18D stored in the hard disk 13. The part after @ in the obtained e-mail address, that is, "aaa.ne.jp" is then obtained as a domain name. After the processing in S911, the processing in FIG. 9 ends.

Figure 10:
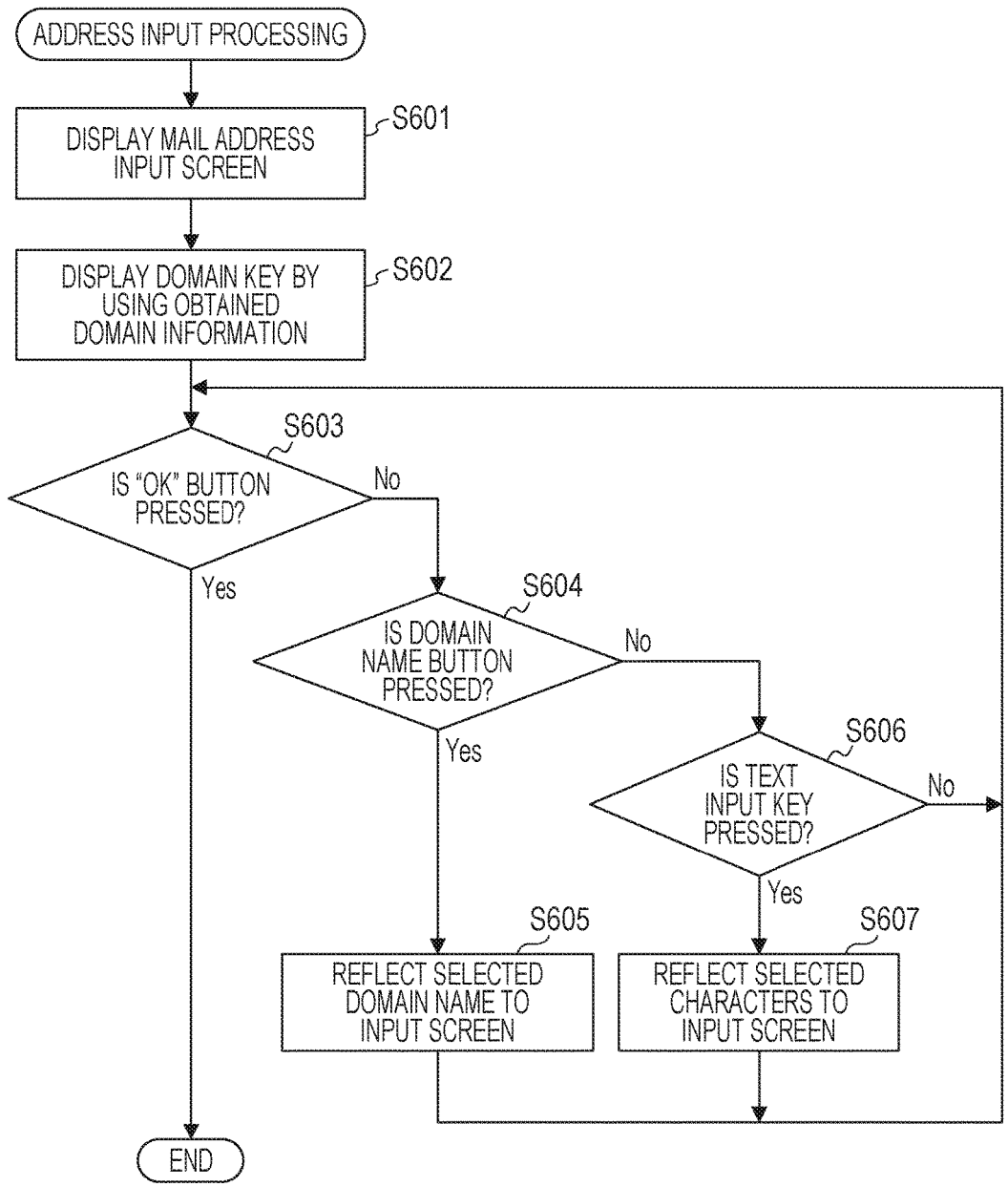
FIG. 10 is a flowchart illustrating address input processing according to an embodiment.

FIG. 10 is a flowchart illustrating a flow of processing to be executed by the CPU 11 in the address input processing in S105 illustrated in FIG. 7. The processing according to the flowchart is implemented by a program which is stored in the hard disk 13, is developed in the RAM 12, and is executed by the CPU 11. The flowchart is started in response to completion of the domain-name obtaining processing illustrated in FIG. 9.

The CPU 11 displays the e-mail address input screen 701 illustrated in FIG. 5 on the operating unit 21 (S601).

The CPU 11 uses the domain names obtained in the domain-name obtaining processing to display the domain name buttons 703 and 704 (S602). After the processing in S602 completes, the CPU 11 receives a press on the text input key 706, the domain name button 703 or 704, or the button 705 performed by a user through the operating unit 21. A user may use the key or button to input an e-mail address. Having described that a plurality of domain name buttons are displayed according to this embodiment, one domain name button may be displayed.

The CPU 11 determines whether an "OK" button 707 has been pressed (S603). If it is determined that the "OK" button 707 has been pressed, the CPU 11 determines that completion of the operation for inputting an e-mail address is instructed and exits the processing illustrated in the flowchart in FIG. 10. In this case, a transmission screen 1101 in FIG. 12, which will be described below, is displayed which includes the character string displayed on the address display area 702 as the input e-mail address.

If it is determined that the "OK" button 707 has not been pressed, the CPU 11 determines whether the domain name button 703 or 704 has been pressed (S604). It is assumed here that it is determined that the domain name button 703 or 704 has been pressed in the flowchart. In a case where many domain names are obtained in S601, a screen illustrated in FIG. 6 may be displayed in response to a press on the button 705 so that a domain name other than the domain names displayed on the domain name buttons 703 and 704 can be input.

If it is determined that one of the domain name buttons 703 and 704 has been pressed, the CPU 11 adds and displays the domain name corresponding to the pressed domain name button to the end of the character string displayed in the address display area 702 (S605). After the domain name is added in the address display area 702, the CPU 11 returns the processing to S603.

If it is determined in S604 that none of the domain name buttons 703 and 704 has not been pressed, the CPU 11 determines whether the text input key 706 has been pressed (S606). If the text input key 706 has been pressed, the CPU 11 displays text corresponding to the pressed text input key in the address display area 702 (S607). After the text corresponding to the pressed key is displayed in the address display area 702, the CPU 11 returns the processing to S603.

If the text input key 706 has not been pressed, the CPU 11 returns the processing to S603.

Figure 11:
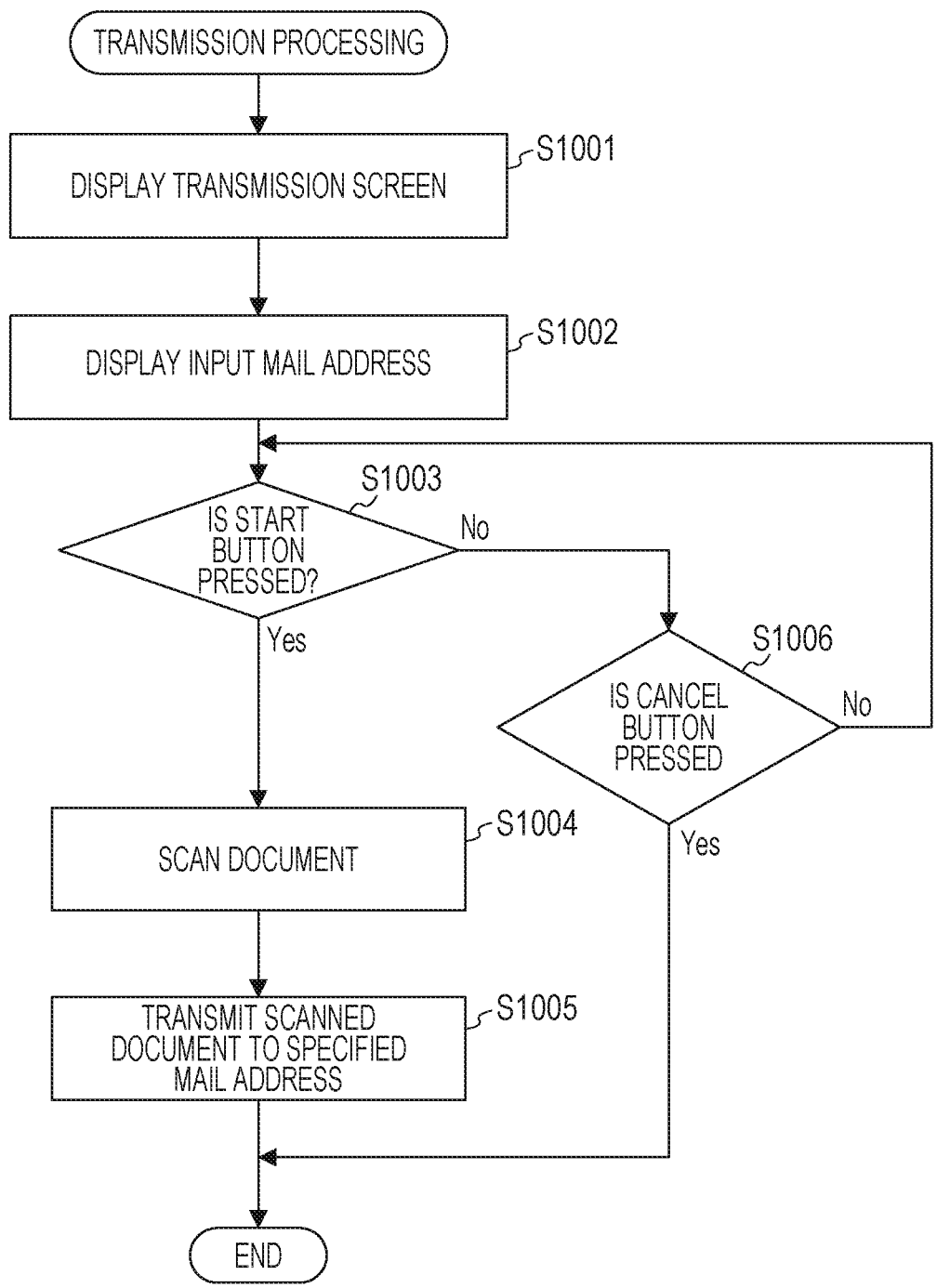
FIG. 11 is a flowchart illustrating a flow of transmission processing according to this embodiment.

FIG. 11 is a flowchart illustrating a flow of processing to be executed by the CPU 11 in the transmission processing in S105 illustrated in FIG. 7. The processing according to the flowchart is implemented by a program which is stored in the hard disk 13, is developed in the RAM 12, and is executed by the CPU 11. The processing illustrated in FIG. 11 is started in response to completion of the address input processing illustrated in FIG. 10.

Figure 12:
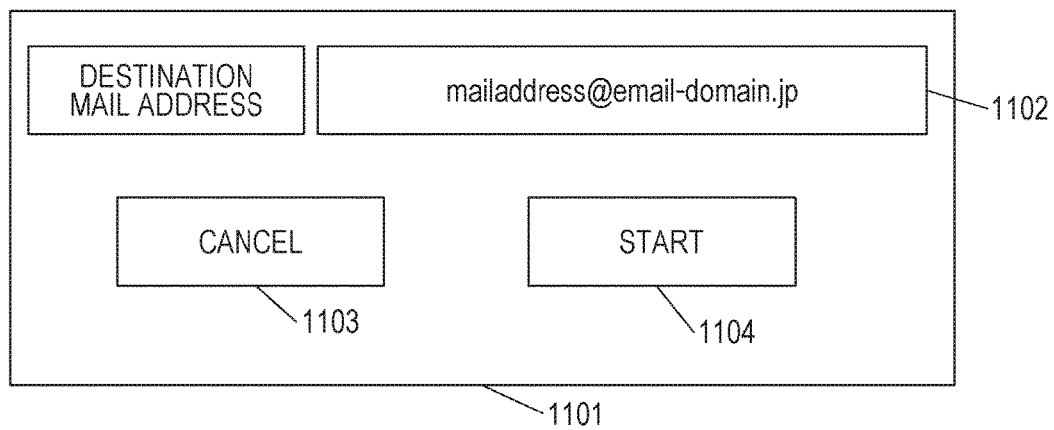
FIG. 12 illustrates an example of a transmission screen to be displayed on an operating unit.

The CPU 11 displays the transmission screen 1101 illustrated in FIG. 12 on the operating unit 21. A destination display area 1102 displays an e-mail address of a destination. A "START" button 1104 is usable for scanning a document by using the scanner 19 and transmitting an e-mail to a destination displayed in the destination display area 1102. A "CANCEL" button 1103 is usable for exiting the transmission processing.

The CPU 11 displays the e-mail address input in S104 in the destination display area 1102 (S1002). The CPU 11 determines whether the "START" button 1104 has been pressed (S1003). If it is determined that the "START" button 1104 has been pressed, the CPU 11 requests the scanner I/F 17 to start scanning of a document by using the scanner 19. Then, the scanner 19 scans the document (S1004). After the scanning of the document by the scanner 19 completes, the CPU 11 receives image data generated by the scanner 19 through the scanner I/F 17.

The CPU 11 transmits image data generated by scanning the document in S1004 to the e-mail address input in S104 (S1005). After the transmission completes, the CPU 11 exits the processing on the flowchart illustrated in FIG. 11 ends.

If it is determined in S1003 that the "START" button 1104 has not been pressed, the CPU 11 determines whether the "CANCEL" button 1103 has been pressed (S1006). If the "CANCEL" button 1103 has been pressed, the processing illustrated in FIG. 10 ends. If the "CANCEL" button 1103 has not been pressed, the CPU 11 returns the processing to S1003.

Next, with reference to FIGS. 13 and 14, the address book processing in S107 illustrated in FIG. 7 will be described. The address book processing is processing for newly registering a destination to an address book and invoking a registered destination.

Figure 13:
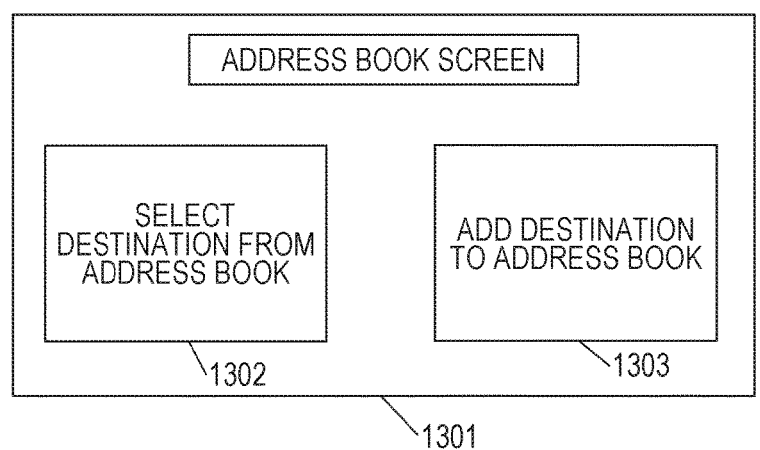
FIG. 13 illustrates an example of an address book screen to be displayed on an operating unit.

FIG. 13 illustrates an example of an address book screen 1301 to be displayed when a user presses the button 203 on the basic screen 201. A destination designation button 1302 is usable for selecting a destination of an email from destinations registered with an address book stored in the hard disk 13. A destination addition button 1303 is usable for adding a new destination to an address book stored in the hard disk 13.

Figure 14:
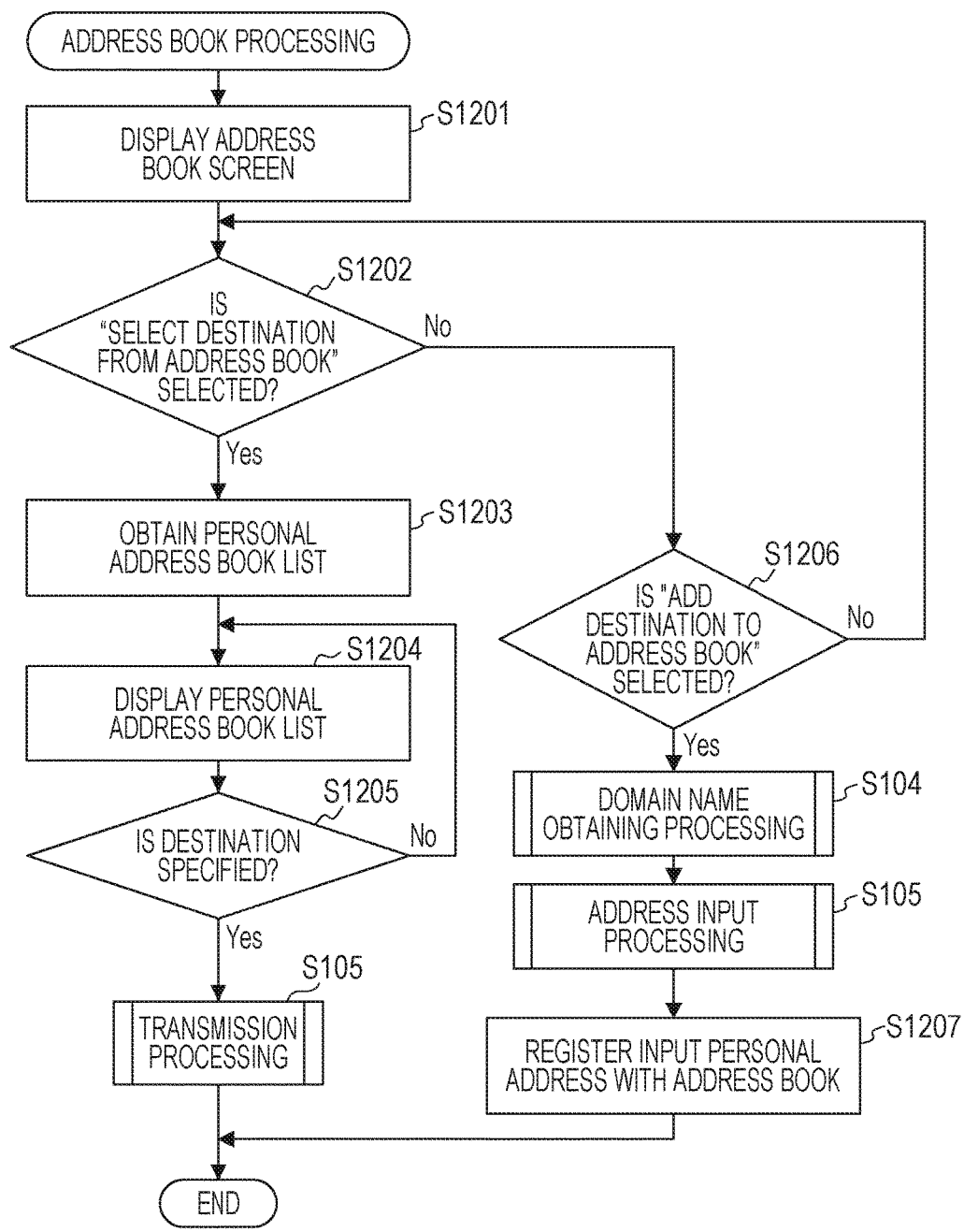
FIG. 14 is a flowchart illustrating a flow of address book processing according to an embodiment.

FIG. 14 is a flowchart illustrating a flow of processing to be executed by the CPU 11 in the address book processing in S107 illustrated in FIG. 7. The processing according to the flowchart is implemented by a program which is stored in the hard disk 13, is developed in the RAM 12, and is executed by the CPU 11.

The CPU 11 displays the address book screen 1301 illustrated in FIG. 13 on the operating unit 21 (S1201). The CPU 11 determines whether the destination designation button 1302 has been pressed (S1202). If the destination designation button 1302 has been pressed, the CPU 11 obtains from the hard disk 13 a personal address book stored in association with the user authenticated by the authentication processing illustrated in FIG. 8 (S1203).

The CPU 11 displays a list of destinations stored in the personal address book obtained in S1203 on the operating unit 21 (S1204).

The CPU 11 determines whether a destination has been designated from the list of destinations displayed in S1204 (S1205). For example, it is determined that a destination has been designate based on a press of an arbitrary destination performed by a user among the displayed listed destinations. An "OK" button may be displayed on a screen displaying a list of destinations, not illustrated. When a user presses and selects an arbitrary destination among listed destinations and then presses the "OK" button, it may be determined that the selected destination has been designated.

If no destination has been designated in S1205, the CPU 11 continuously executes the processing in S1204.

After a destination is designated in S1205, the CPU 11 executes the transmission processing illustrated in FIG. 11 (S105).

If it is determined in S1202 that the destination designation button 1302 has not been pressed, the CPU 11 determines whether the destination addition button 1303 has been pressed (S1206). If the destination addition button 1303 has been pressed, the CPU 11 executes the domain-name obtaining processing (S104) and the address input processing (S105). After the address input processing ends, the CPU 11 registers the input destination with the personal address book of the log-in user stored in the hard disk 13. The processing in the flowchart ends (S1207).

Figure 15:
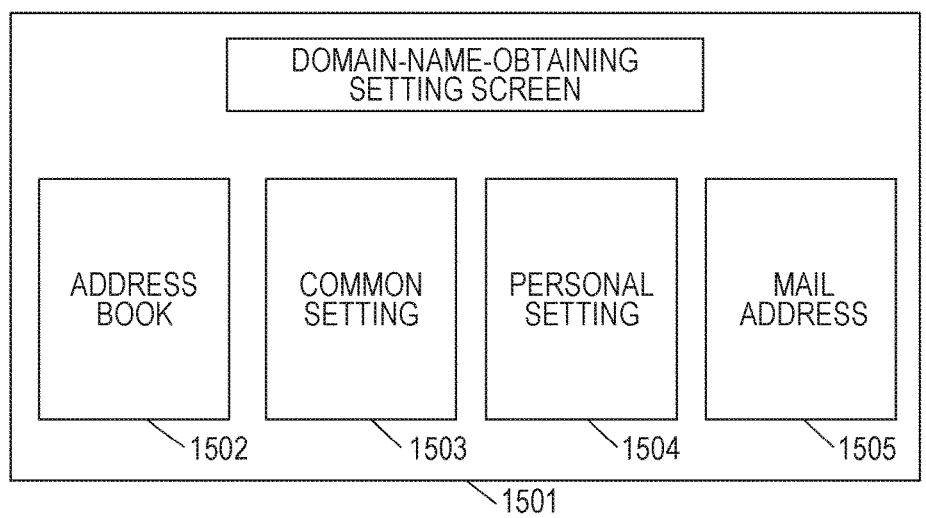
FIG. 15 illustrates an example of a setting screen for obtaining domain name information to be displayed on an operating unit.
Figure 16:
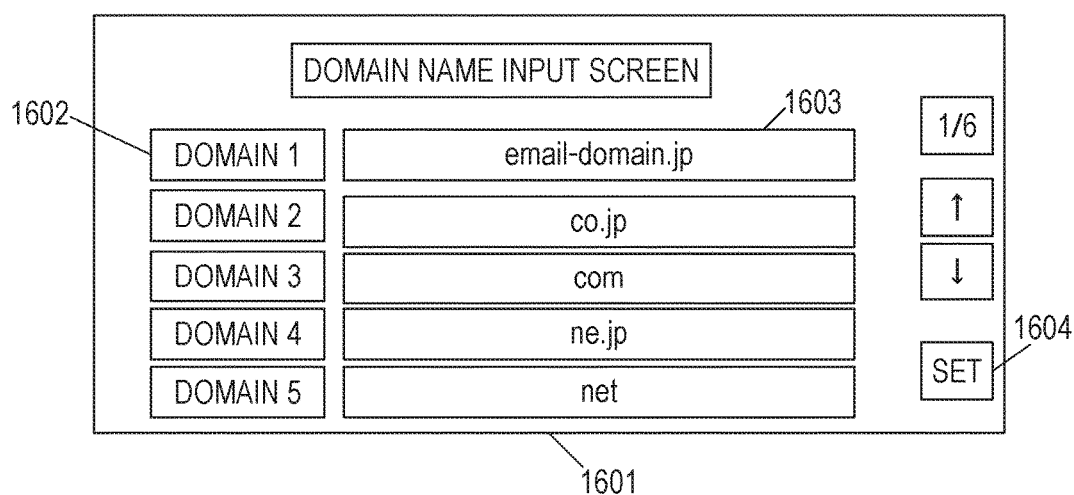
FIG. 16 illustrates an example of a domain name input screen to be displayed on an operating unit.

Next, the domain-name-obtaining setting processing in S109 illustrated in FIG. 7 will be described with reference to FIGS. 15 to 17. FIGS. 15 and 16 illustrates examples of screens to be displayed on the operating unit 21 in order to define a setting for obtaining a domain name.

FIG. 15 illustrates a domain-name-obtaining setting screen 1501 to be displayed on the operating unit 21 when a user presses the button 204 on the basic screen 201 illustrated in FIG. 4. A button 1502 is usable for defining a setting for obtaining a domain name to be displayed on a domain name button from an e-mail address registered with an address book. According to this embodiment, in response to a selection of the button 1502, a domain name of an e-mail address registered with a personal address book of a log-in user is displayed on a domain name button on the e-mail address input screen.

A button 1503 is usable for defining a setting for displaying on a domain name button a domain name registered with a shared domain name database stored in the hard disk 13 in the information processing apparatus 1. When a user presses the button 1503, a domain name input screen 1601 illustrated in FIG. 16 is displayed on the operating unit 21. A domain name to be displayed here or a domain name to be input here corresponds to a domain name which can be used in common for displaying a domain name button by any user logging into the information processing apparatus 1. A domain name is registered with a number 1602. Domain name buttons are displayed in increasing order of the number 1602 on the e-mail address input screen 701.

FIG. 16 illustrates a domain name display area 1603. The domain name display area 1603 displays a domain name registered with a domain name database. A user may press the domain name display area to change the domain name displayed on the display area. For example, when a user press a domain display area having "email-domain.jp" thereon, a software keyboard may be displayed on the operating unit 21 so that the user can input a character string on the domain name display area. In response to a press of a "SET" button 1604 performed by a user, the display of the domain name input screen 1601 is closed.

The button 1504 is set to be usable for displaying on the e-mail address input screen 701 a domain name registered with a personal domain name database stored in the hard disk 13 for each user. In response to a press on the button 1504 performed by the user, the domain name input screen 1601 illustrated in FIG. 16 is displayed. However, a domain name registered on the screen is displayed on the e-mail address input screen 701 only when a user logs in who is identical to the user logging into the information processing apparatus 1. Therefore, when a different user logs in, a domain name registered with the personal domain name database by the different user is displayed on the domain name button.

A button 1505 on the domain-name-obtaining setting screen 1501 is set to display a domain name of an e-mail address of a log-in user on a domain name button. A user who is allowed to log in the information processing apparatus 1 is given a personal e-mail address. According to this embodiment, the association between a user and a personal e-mail address is stored in the hard disk 13 in the information processing apparatus 1. However, the association between a user and a personal e-mail address may be stored in an external storage device connected to the information processing apparatus 1.

Figure 17:
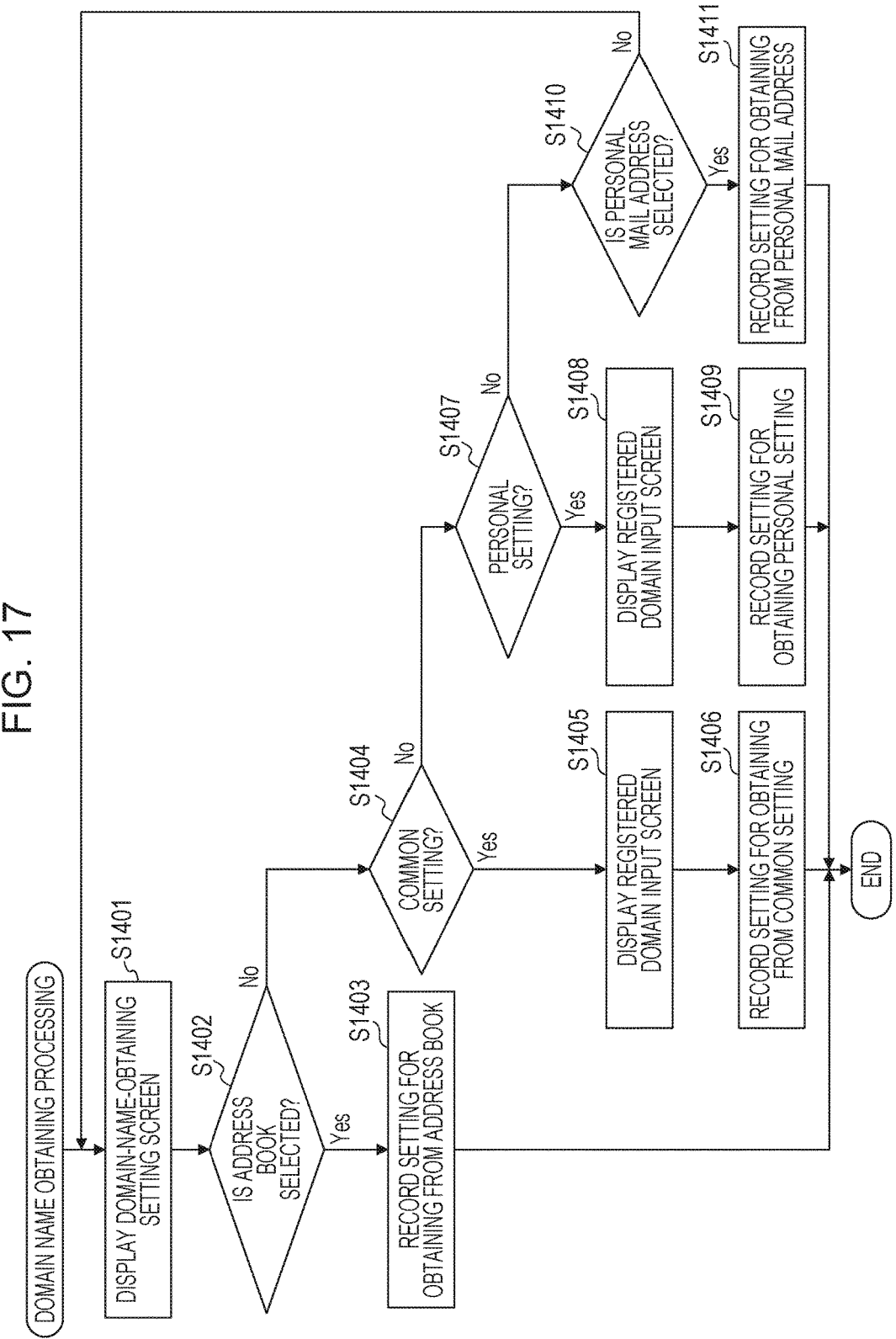
FIG. 17 is a flowchart illustrating a flow of setting processing for obtaining domain information according to this embodiment.

FIG. 17 is a flowchart illustrating a flow of processing to be executed by the CPU 11 in the domain-name-obtaining setting processing in S110 illustrated in FIG. 7. The processing according to the flowchart is implemented by a program which is stored in the hard disk 13, is developed in the RAM 12, and is executed by the CPU 11.

The processing illustrated in FIG. 17 starts in response to a press on the button 204 on the basic screen 201 displayed on the operating unit 21.

The CPU 11 displays a domain-name-obtaining setting screen illustrated in FIG. 15 on the operating unit 21 (S1401). After that, the CPU 11 determines whether the button 1502 has been pressed to select an address book (S1402). If it is determined that the button 1502 has been pressed, the CPU 11 displays the e-mail address input screen 701 on the operating unit 21 by storing in the hard disk 13 a setting for displaying a domain name of an e-mail address registered with a personal address book (S1403). After that, the processing illustrated in the flowchart ends.

If it is determined that the button 1502 has not been pressed, the CPU 11 determines whether the button 1503 has been pressed to select a common setting (S1404). If the button 1503 has been pressed, the CPU 11 obtains a shared domain name database stored in the hard disk 13 and displays the domain name input screen 1601 on the operating unit 21 (S1405). In S1405, the CPU 11 displays the domain name input screen illustrated in FIG. 16 by using a registration number and domain name stored in a shared domain name database illustrated in FIG. 18A. After that, a domain name is registered on the domain name input screen 1601 based on a user's operation.

In response to a press on a "SET" button 1604 performed by a user, the CPU 11 stores in the hard disk 13 a setting for displaying a domain name registered with a common setting on a domain name button on the e-mail address input screen (S1403). Here, domain names stored are used as a shared domain name database. After that, the processing illustrated in the flowchart ends.

If the button 1503 has not been pressed, the CPU 11 determines whether the button 1504 has been pressed to select a personal setting (S1407). If the button 1504 has been pressed, the CPU 11 displays the domain name input screen illustrated in FIG. 16 on the operating unit 21 (S1408). In S1408, the CPU 11 displays the domain name input screen illustrated in FIG. 16 based on the personal domain name database illustrated in FIG. 18B, which is stored in the hard disk 13, on the operating unit 21. After that, a domain name is registered on the domain name input screen 1601 based on a user's operation.

In response to a press on the "SET" button 1604 performed by a user, the CPU 11 stores in the hard disk 13 the currently logging in user and the domain name input on the domain name input screen 1601 in association as a personal setting. Thus, a user can add or delete a domain name registered with his or her personal domain name database. The CPU 11 stores in the hard disk 13 a setting for displaying a domain name stored as a personal setting on a domain name button on the e-mail address input screen in response to a press performed on the "SET" button 1604 (S1409). Here, domain names stored in the hard disk 13 are used as a personal domain name database.

If the button 1504 has not been pressed, the CPU 11 determines whether the button 1505 has been pressed to select a personal e-mail address (1410). If the button 1410 has been pressed, the CPU 11 stores in the hard disk 13 a setting for displaying a domain name of an e-mail address of a log-in user on a domain name button on the e-mail address input screen while the user is logging in (S1411). After that, the processing illustrated in the flowchart ends.

If the button 1505 has not been pressed, the CPU 11 returns the processing to S1401.

According to the first embodiment, a personal address book is stored in the hard disk 13. A shared address book which is available to all users of the information processing apparatus 1 may be stored in the hard disk 13 in addition to a personal address. In this case, when an address book is selected as a domain-name-obtaining setting, a domain name of an e-mail address registered with the personal address book and the shared address book is displayed on a domain name button.

According to the first embodiment, it is set for obtaining a domain name from a personal address book or a user's personal e-mail address. With the setting, a character string located after a delimiter such as an at sign is extracted from an e-mail address registered with the personal address book or an e-mail address of a log-in user, and is displayed on a domain name button. Thus, the domain name button to be displayed can be determined for each user logging into the information processing apparatus.

According to the first embodiment, the domain-name-obtaining setting is a personal setting so that a domain name registered with a personal domain name database can be displayed on a domain name button. Thus, a domain name to be displayed on a domain name display button can be determined for each user. This can prevent a domain name which is not used by a log-in user from being displayed on a domain name button.

Furthermore, a domain to be input, which is selected from displayed domain name candidates, is received so that a user can input a domain name without being required to input the domain name letter by letter by using a keyboard.

OTHER EMBODIMENTS

According to the first embodiment, a domain name to be displayed may be obtained from one of a personal address book, a shared domain name database, a personal domain name database, and an e-mail address of a log-in user. However, a domain name to be displayed may be obtained from a plurality of the sources described above as well.

For example, it may be configured such that a user can set whether to use a personal address book, a shared domain name database, a personal domain name database, and an e-mail address of a log-in user as a source of a domain name or not, individually. Thus, in some embodiments, more domain names can be displayed on domain name buttons than those of the first embodiment.

According to the first embodiment, a domain name may be obtained from an e-mail address registered with a personal address book of a log-in user. Users may be divided into groups in advance, and a domain name of an e-mail address registered with an address book of another user in a group to which a log-in user belongs or a shared address book of the group, may be displayed on a domain name button.

According to the first embodiment, on the e-mail address input screen 701, the domain name buttons 703 and 704 can be displayed as keys that can be pressed. However, without limiting to the above method, candidates for a domain name may be displayed by other methods as well. For example, on the e-mail address input screen 701, a user may input an e-mail address, and a list of candidates for a domain name may be displayed in the address display area 702 in response to input of a delimiter such as an at sign performed by a user. In response to a selection of a domain name from a domain name list performed by a user, the selected domain name may be displayed as a character string to be input in an address display area.

According to the first embodiment, a character string located after an at sign defined as a delimiter is displayed as a domain name on the e-mail address input screen 701. A character string including an at sign may be displayed as a domain name on the e-mail address input screen 701.

The present disclosure may be implemented by execution of the following processing. That is, software (for example, a program or programs) implementing functions of the aforementioned embodiments may be supplied to a system or an apparatus over a network or through a storage medium, and a computer (or a processor, CPU or an MPU, for example) in the system or the apparatus may read out and execute the program. In this case, the computer program and a storage medium storing the computer program are components of embodiments of the present disclosure.

Various embodiments of the present disclosure can determine a candidate for a domain name to be displayed for each user of an information processing apparatus.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While various embodiments have been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-230826 filed Nov. 29, 2016, which is hereby incorporated by reference herein in its entirety.

What is claimed is:

1. An information processing apparatus comprising:
   a network interface for transmission of data;
   at least one memory storing instructions, and
   at least one processor, the instructions when executed by the at least one processor causing the information processing apparatus to:
   obtain identification information of a user; and
   display a candidate for a domain name to be used in a destination address of data to be transmitted using the network interface,
   wherein, as the displayed candidate, a domain name based on the obtained identification information is displayed.

2. The information processing apparatus according to claim 1, wherein the candidate is displayed in a screen including a software keyboard usable for inputting an address and the candidate for the domain name is displayed as software keys.

3. The information processing apparatus according to claim 1, further comprising a storage storing user information regarding the user identified by the identification information and an address for the user in association,
   wherein, as the displayed candidate, a domain name of the address stored in the storage in association with the user information regarding the user identified by the obtained identification information is displayed.

4. The information processing apparatus according to claim 1, further comprising a storage storing user information regarding the user identified by the identification information and a domain name to be used by the user,
   wherein, as the displayed candidate, the domain name stored in the storage in association with the user information regarding the user identified by the obtained identification information is displayed.

5. The information processing apparatus according to claim 4, wherein the instructions, when executed, further cause the information processing apparatus to register, in accordance with a user instruction of the user, a domain name in the storage in association with the user information regarding the user.

6. The information processing apparatus according to claim 1, further comprising a storage storing user information regarding the user identified by the identification information and an address book of the user in association,
   wherein, as the displayed candidate, a domain name of an address registered with the address book stored in the storage in association with the user information regarding the user identified by the obtained identification information is displayed.

7. The information processing apparatus according to claim 1, wherein the domain name is a character string located after an at sign in an address.

8. The information processing apparatus according to claim 1, wherein the domain name includes an at sign and is a character string located after the at sign in an address.

9. The information processing apparatus according to claim 1, wherein the address is an e-mail address to be used for transmission of an e-mail.

10. The information processing apparatus according to claim 1, further comprising an image scanner for scanning an image of a document and generating image data therefrom,
    wherein the displayed candidate is a candidate for a domain name to be used in a destination address of the transmission of the image data.

11. A control method for an information processing apparatus including a network interface for transmission of data, the control method comprising:
    obtaining identification information of a user; and
    displaying a candidate for a domain name to be used in a destination address of data to be transmitted using the network interface,
    wherein, as the displayed candidate, a domain name based on the obtained identification information is displayed.

12. A non-transitory computer readable storage medium storing a program which, when executed, causes a computer to implement a control method for an information processing apparatus including a network interface for transmission of data, the control method comprising:
    obtaining identification information of a user; and
    displaying a candidate for a domain name to be used in a destination address of data to be transmitted using the network interface,
    wherein, as the displayed candidate, a domain name based on the obtained identification information is displayed.

* * * * *